United States Patent
Yehle et al.

(10) Patent No.: US 10,791,614 B2
(45) Date of Patent: Sep. 29, 2020

(54) CONDUCTIVE SHEETS TO DISCHARGE NON-CONDUCTIVE SURFACES

(71) Applicant: TEXAS INSTRUMENTS INCORPORATED, Dallas, TX (US)

(72) Inventors: Joseph Milton Yehle, Dallas, TX (US); Feng-Min Chang, Taipei (TW); Geoffrey Thomas Haigh, Boxford, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 459 days.

(21) Appl. No.: 15/859,255

(22) Filed: Dec. 29, 2017

(65) Prior Publication Data

US 2019/0208612 A1   Jul. 4, 2019

(51) Int. Cl.
| H05F 3/02 | (2006.01) |
| H01B 5/14 | (2006.01) |
| A47B 13/08 | (2006.01) |
| B32B 7/08 | (2019.01) |

(52) U.S. Cl.
CPC ............. *H05F 3/02* (2013.01); *A47B 13/086* (2013.01); *B32B 7/08* (2013.01); *H01B 5/14* (2013.01); *A47B 2200/008* (2013.01); *B32B 2307/202* (2013.01); *B32B 2479/00* (2013.01)

(58) Field of Classification Search
CPC ........... H05F 3/02; H01B 5/14; A47B 13/086; A47B 2200/008; B32B 7/08; B32B 2307/202; B32B 2479/00
USPC ........................................................ 361/220
See application file for complete search history.

(56) References Cited

U.S. PATENT DOCUMENTS

| 4,649,374 A | * | 3/1987 | Hoigaard | ................ G01R 31/54 340/573.1 |
| 4,802,056 A | * | 1/1989 | Aronson | .................... H05F 3/02 361/212 |
| 6,154,956 A | * | 12/2000 | Frohardt | ................. A47B 11/00 108/139 |

* cited by examiner

*Primary Examiner* — Kevin J Comber
(74) *Attorney, Agent, or Firm* — Ronald O. Neerings; Charles A. Brill; Frank D. Cimino

(57) ABSTRACT

In some examples, a system comprises a non-conductive layer; a conductive sheet positioned on an area of the non-conductive layer; a non-conductive surface in contact with the conductive sheet; a safety enclosure positioned on the non-conductive surface and configured to contain a high-voltage device; a ground connection coupling to the conductive sheet and extending through the non-conductive layer; and a coupling member to couple together the non-conductive layer, the conductive sheet, the non-conductive surface, and the safety enclosure.

19 Claims, 7 Drawing Sheets

CONDUCTIVE SHEETS TO DISCHARGE NON-CONDUCTIVE SURFACES

BACKGROUND

Generally, in low-voltage testing, grounding techniques have been implemented to increase the validity of test results, as well as to avoid electro-static discharge that can damage a device-under-test. In high-voltage testing, additional discharge conditions can occur due to the charge build-up on test surfaces, such as desks and work benches, from high-voltage leakage.

SUMMARY

In accordance with at least one example of the disclosure, a system includes a non-conductive surface, a conductive sheet positioned on an area of the non-conductive surface, a non-conductive layer in contact with the conductive sheet, and a safety enclosure positioned on the non-conductive layer and configured to contain a high-voltage device. A ground connection couples to the conductive sheet and extending through the non-conductive surface. A coupling member couples together the non-conductive surface, the conductive sheet, the non-conductive layer, and the safety enclosure.

In some examples, a system comprises a table supported by a leg and having first and second non-conductive portions; a conductive sheet positioned between the non-conductive portions; a ground connection coupled between the conductive sheet and ground and extending through the second non-conductive portion and along the leg; and a coupling member fastening together the first and second non-conductive portions and the conductive sheet.

In accordance with another example of the disclosure, a method includes obtaining a table and positioning a conductive sheet over a portion of the table. A ground connection is provided between the conductive sheet and ground via the table. A non-conductive layer is positioned in contact with the conductive sheet, wherein the non-conductive layer secures the conductive sheet between the non-conductive layer and the table. A safety enclosure on a portion of the non-conductive layer, and attaching the safety enclosure, the non-conductive layer, the conductive sheet, and the table using a coupling member.

BRIEF DESCRIPTION OF THE DRAWINGS

For a detailed description of various examples, reference will now be made to the accompanying drawings in which.

DETAILED DESCRIPTION

Figure 1A:
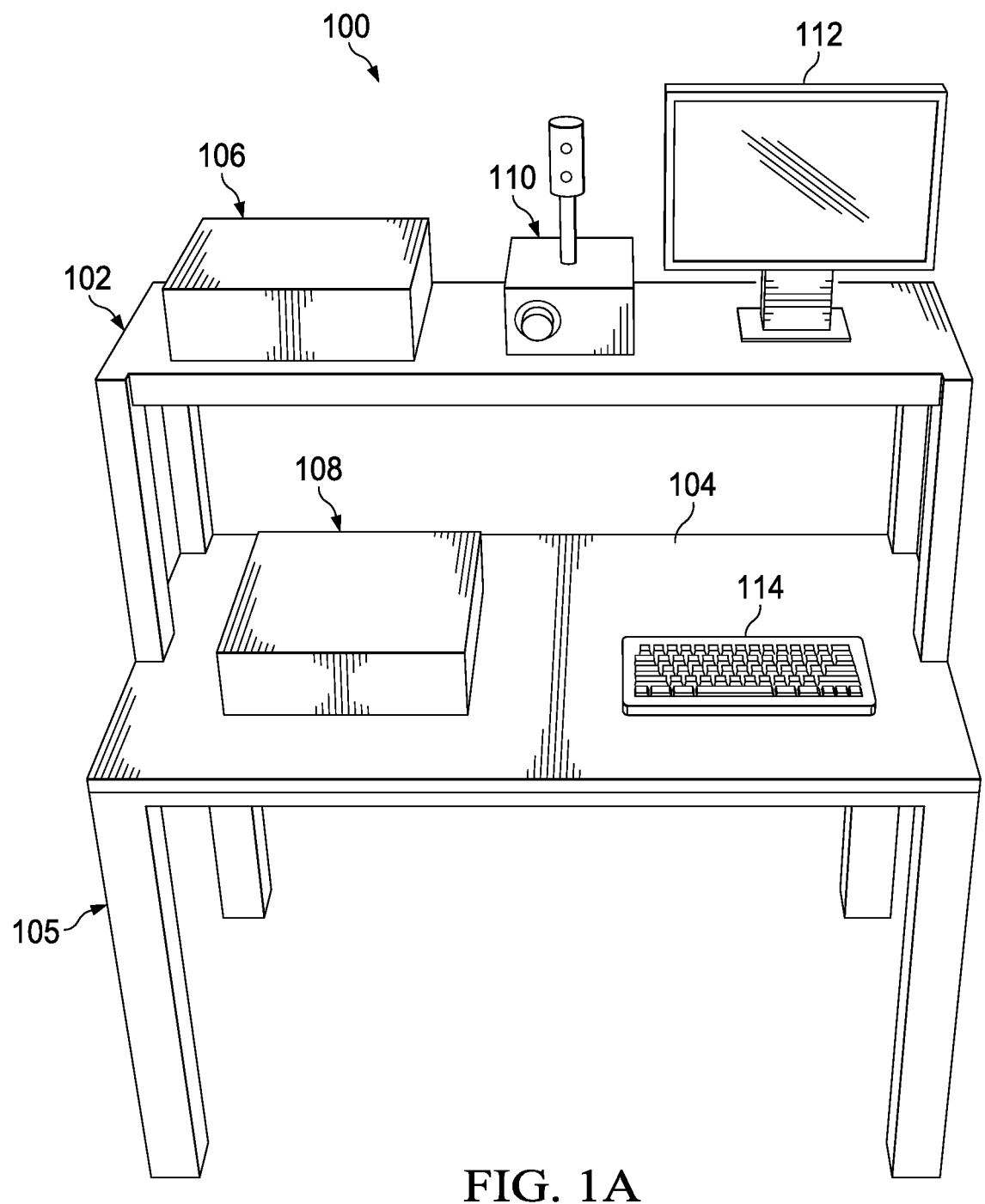
FIGS. 1A and 1B are perspective views of a system in a high-voltage test environment in accordance with various examples.

Generally, the generation and application of a high-voltage source are limited to specific areas. Physical barriers are put place around the high-voltage source and a device-under-test, or high-voltage device, to avoid unintended physical contact with the device. Physical barriers may also be referred to as galvanic isolation, which serves to remove a direct path to a high-voltage source. Unintended, or inadvertent, physical contact with a high-voltage source and/or the high-voltage device can generate a high-voltage ground connection through an object and/or person to ground. The resulting discharge may damage the high-voltage device, test equipment, and perhaps a test operator.

Though a physical barrier may limit unintended physical contact, a high-voltage source and the high-voltage device, in contrast to low-voltage sources and/or devices, further introduce leakage current and/or leakage voltage to objects in the test environment. The leakage current and/or voltage (such as in the form coupling forces generated by of magnetic and/or electric fields) cause surrounding items to become charged and capable of a potentially hazardous discharge when introduced to a ground connection. Examples include objects in close proximity to the high-voltage source and/or a device-under-test, such as the table upon which the high-voltage device rests (though positioned in a non-conductive safety enclosure), test equipment such as computers, probes, personal electronics, etc., and the test operator.

Though a safety enclosure eliminates a direct path to a high-voltage source and/or high-voltage device, a safety enclosure does not mitigate the leakage current and/or voltage conditions. Leakage current and/or voltage mitigation relies on discharging the coupling forces caused by magnetic and/or electric fields.

One technique to discharge coupling forces has been to provide a low impedance connection to ground from as many objects as feasible in a high-voltage test environment. In this respect, however, the unintended consequence is that a test operator will at some point become a part of one of the many available ground connections, creating a dangerous discharge condition.

Another technique to discharge coupling forces has been to provide a floating (or isolated) ground test environment. Though a floating ground test environment minimizes the possible ground connections, leakage current is generated from the electric and/or magnetic fields from the high-voltage source and/or the high-voltage device, and they can still place dangerously high charges on objects in the test environment because the coupling forces are not discharged. For example, a charge from the leakage current and/or voltage of a high-voltage source may exceed 500 volts (AC).

Also, though many ground connections may be eliminated using the floating ground technique; it is difficult to reliably eliminate all ground connections. For example, a ground connection is formed between the high-voltage source and the wall socket. Unintended and/or inadvertent physical contact with an object or even a safety enclosure may trigger a ground connection and result in a dangerous discharge.

As another example, a computer keyboard is coupled with computer device, and if the USB cable of the keyboard becomes frayed, the exposed wiring could form a ground connection into the computer device, and the resulting discharge may damage the device. That is, though many ground connections can be eliminated in a high-voltage test environment, achieving a total floating-ground condition is impractical to achieve.

In this respect, the system and method of the examples disclosed herein provide for discharging the coupling forces caused by magnetic and/or electric fields from leakage current and/or voltage in a high-voltage test environment. Specifically, examples include conductive sheets that are positioned within the tables on which safety enclosures housing high-voltage devices are placed. These conductive sheets draw charges from the table and funnel them to a ground connection, thus safely discharging the table and mitigating damage to equipment and human operators.

Figure 1B:
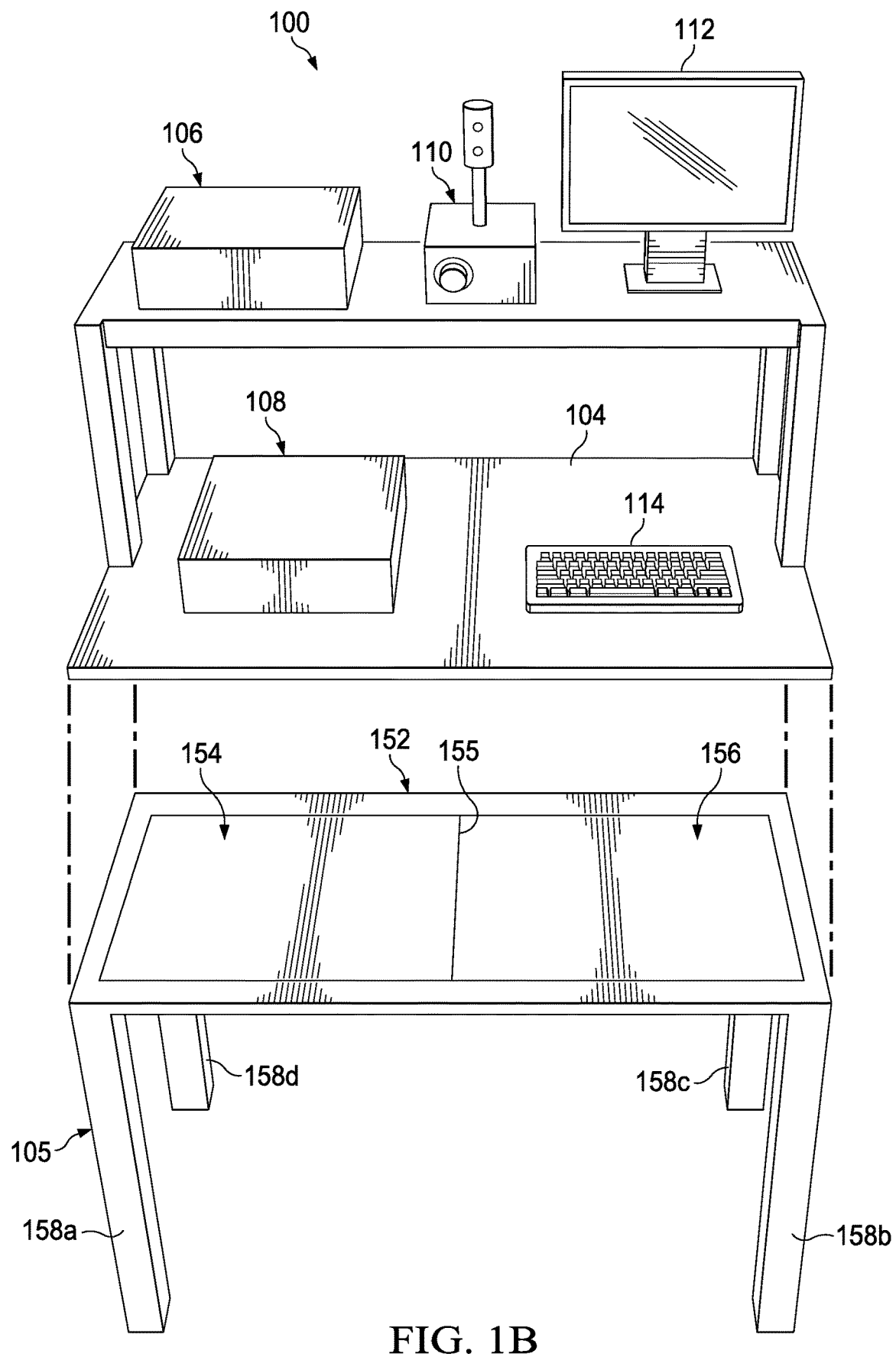

FIGS. 1A and 1B illustrate a high-voltage test environment system 100. Referring to FIG. 1A, the high-voltage test environment system 100 includes a table 105 and a small table 102 positioned on top of the table 105 to provide multi-level work surfaces for a test operator, with the small table 102 set back with respect to a front edge of the table 105. Examples of high-voltage tests that the high-voltage test environment system 100 may accommodate include time dielectric breakdown (TDDB) testing, surge testing, common mode transient immunity (CMTI) testing, partial discharge testing, electro-static discharge testing, etc.

The table 105 includes a safety enclosure 108, a keyboard 114, and a non-conductive surface 104. The safety enclosure 108 provides galvanic isolation in the form of a non-conductive enclosure and/or envelope to contain a high-voltage device (or device-under-test). A high-voltage device can be an electronic component, an electronic component coupled to a test bed, an electronic device having multiple electronic components, etc. Such devices can be used in power applications including power transfer, discrete power supplies, integrated power couplings, etc.

The safety enclosure 108 functions to mitigate unintended and/or inadvertent direct contact with the high-voltage device within enclosure 108. To this end, the safety enclosure 108 is of a non-conductive, high surface resistivity material to avoid inadvertently creating a direct ground connection with the high-voltage device. The high-voltage device, however, generates leakage currents and/or voltages that extend beyond the boundaries of the safety enclosure 108, and incur charges to the table 105, the non-conductive surface 104, the keyboard 114, etc.

The small table 102 includes a high-voltage source 106, a safety light tree & emergency power-off button 110, and a monitor 112.

The high-voltage source 106 is operable to provide a high voltage for testing of a high-voltage device. An example of high-voltage sources includes those capable of exceeding 1000 Volts-AC. The high-voltage source 106 operates to generate a voltage for test of a high-voltage device contained by the safety enclosure 108. High voltage is conveyed to the high-voltage device by power cables rated for high-voltage applications.

The safety light tree and emergency power-off button 110 provides visual indication to a test operator of test status. For example, a red light can indicate a warning that a high-voltage test in process, and that caution is to be exercised. As another example, a green light can indicate that a high-voltage test has concluded, and that a test operator may approach to perform measurements, review results on the monitor 112, etc. The power-off button allows a test operator to disengage the power from the high-voltage source 106 before completion of a high-voltage test.

In the high-voltage test environment system 100, the high-voltage source 106 is positioned on the small table 102 away from the safety enclosure 108. In this respect, the distance between high-voltage source 106 and the safety enclosure 108 (and the high-voltage device contained within) is to mitigate capacitive-and/or-inductive-coupling-caused leakage current from the electric and/or magnetic fields of the high-voltage source 106 and/or the high-voltage device contained by the safety enclosure 108.

Also, as shown, the setback of the high-voltage source 106 on the small table 102 with respect to the table 105 places the source 106 out of casual reach of a test operator (because to touch the high-voltage source 106, the test operator would be called upon to reach across the table 105 and upward to the high-voltage source 106).

Through galvanic isolation (that is, isolating the high-voltage source 106 and the safety enclosure 108 in distance and with enclosures), charges are generated on objects and/or users in proximity of the high-voltage source 106 and the safety enclosure 108 by electric and/or magnetic fields produced by the leakage current and/or voltage of the high-voltage source 106 and high-voltage device contained by the safety enclosure 108. The table 105, however, contains a conductive sheet (not visible in the view of FIG. 1A) to collect and dissipate such charges, as described further below.

FIG. 1B illustrates the high-voltage test environment system 100 in a break-away view of the table 105 and non-conductive surface 104. The break-away of the table 105 includes a high-voltage area 154 and an operator area 156 with a boundary 155 therebetween, defined on a non-conductive layer 152, which, in some examples, is part of the table 105. The table 105 includes supporting members, such as legs 158a, 158b, 158c and 158d, for support. As may be appreciated, the table 105 may be an extension from a wall of the test environment 100, as well as other table configurations.

The operator area 156 corresponds to an area in which a test operator may conduct high-voltage testing away from high-voltage source 106 and safety enclosure 108, though isolated by non-conductive coverings, and by a conductive sheet of the high-voltage area 154 that operates to discharge coupling forces within the high-voltage area.

The high-voltage area 154 corresponds to the aspects of the system 100 that operate to avoid creation of a ground connection, such as the safety enclosure 108, and a conductive sheet (not expressly depicted in FIG. 1B) that functions to discharge the coupling forces caused by magnetic and/or electric fields resulting from leakage current and/or voltage in a high-voltage test environment, as is discussed in detail with reference to FIGS. 2A-4.

Figure 2A:
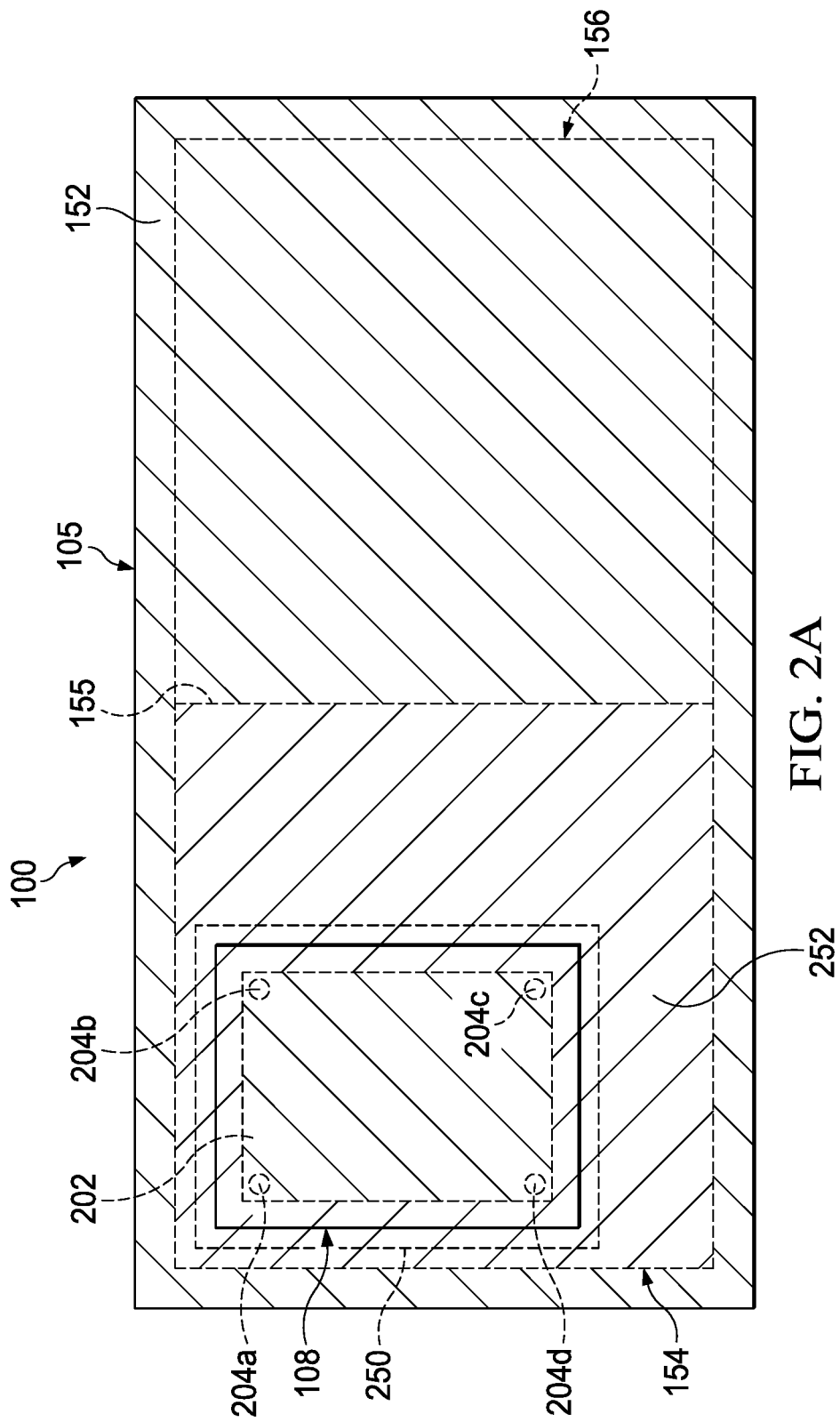
FIGS. 2A and 2B are top and perspective views, respectively, of a system in a high-voltage test environment, in accordance with various examples.
Figure 2B:
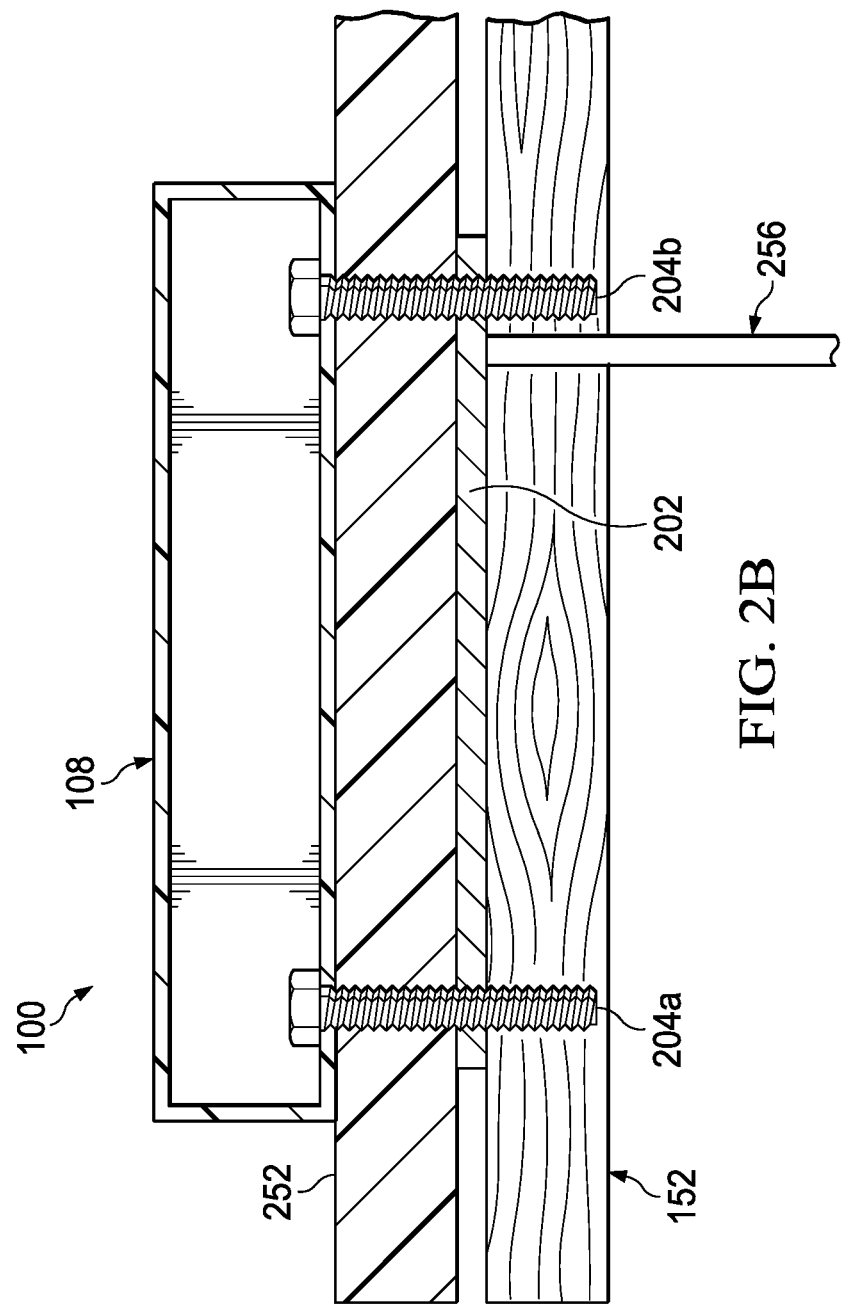

FIGS. 2A and 2B illustrate aspects of the system 100 in a top view perspective and a side view perspective, respectively. In particular, FIG. 2A illustrates a top view of the table 105 of FIG. 1. The system 100 includes high-voltage area 154 and operator area 156.

The high-voltage area 154 has a boundary 250 for inclusion of high-voltage components of the system 100. The high voltage area 154 includes a conductive sheet 202, which functions to discharge the coupling forces caused by magnetic and/or electric fields resulting from leakage current and/or voltage in a high-voltage test environment, as that produced by a high-voltage device contained by the safety enclosure 108. The conductive sheet 202 is composed of a low surface resistivity, high-conductance material including one or more metals such as aluminum, copper, iron, etc., and metal alloys, such as various steel grades, etc. A thickness of the conductive sheet 202 may be sufficient to accommodate a low level electrical current generated by the discharge function (generally on the order of milli-amps). Also, the low-level electrical current can be discharged through a thinner piece of material, because the "skin effect" distributes AC current density nearer the surface of a conductor as compared to the inner portion, and the volume (or amps) of the discharge current would not overpower the conductive sheet. An example of a suitable thickness is in the hundredths of an inch dimension (e.g., 0.03 inches). In some examples, the conductive sheet 202 does not extend to the operator area 156, which excludes high-voltage sources, such as, for example, source 106, the high-voltage device inside the safety enclosure 108, and/or a high-voltage device.

Coupling members 204a, 204b, 204c and 204d couple together the non-conductive surface 252, the conductive sheet 202, the non-conductive layer 152, and the safety enclosure 108. The coupling members 204a, 204b, 204c and 204d are composed of a non-conductive material, and they have strength sufficient to couple the components. An example of such a material is a polyamide-based material (such as nylon), polymer-based materials, etc. Also, the coupling members may be in a screw, bolt, and/or nail configuration to provide a coupling force of the system layers.

The non-conductive surface 252 provides a large resistance to current to further discourage a ground connection upon inadvertent contact with the high-voltage area 154. For example, the non-conductive surface may be provided by a material having a surface resistivity of at least $10^5$ ohms/sq. An example of a suitable material includes phenol based materials (e.g., a phenolic table cover). The non-conductive layer 152 provides support for the table 105, which may include wood and/or plastic materials having a sufficient strength to provide a supporting surface via the non-conductive layer 152—that is, sufficient strength to support a computer keyboard 114, the safety enclosure 108, test tools, part of a user's body weight, etc.

FIG. 2B illustrates a partial cross-sectional side view of aspects of the system 100 including a ground connection 256. The coupling members 204a and 204b (and 204c and 204d in FIG. 2A) couple together the safety enclosure 108, non-conductive surface 252, the conductive sheet 202, and the non-conductive layer 152. The ground connection 256 couples to the conductive sheet 202 and extends through the non-conductive layer 152. In operation, the ground connection 256 forms an intended ground connection to discharge coupling forces within the high-voltage area 154 (FIG. 2A).

Various layered structures may be implemented. For example, in one structure, at least a portion of the non-conductive layer 152 is not covered by the non-conductive surface 252. In another example, the non-conductive layer 152 is in contact with at least a portion of the non-conductive surface 252. In this respect, a contact gap may be present between the surface 252 and the layer 152, while the conductive sheet 202 is positioned between the surfaces. As noted, the non-conductive layer 152 may be of a dimension and/or material that is non-conductive (for example, a wooden table core) for support of items positioned on the non-conductive surface 252.

Further, the non-conductive surface 252 is of a thickness to permit high-voltage leakage current and/or voltage (such as in the form of coupling forces generated by magnetic and/or electric fields) to charge the conductive sheet 202. The ground connection 256, being electrically coupled with the conductive sheet 202, forms a ground connection to discharge the conductive sheet 202. In this respect, the conductive sheet 202 is in the nature of a sacrificial charge-capture for the purpose of discharging the stored energy via the ground connection 256. The non-conductive surface 252 may be composed of a high-resistivity material (such as a material having at least $1 \times 10^5$ ohms/sq of surface resistivity), such as a laminated, or lamination, layer, including phenol based laminations (e.g., a phenolic table cover).

FIGS. 3A, 3B, 3C and 3D illustrate examples of ground connections for forming a ground connection with the conductive sheet 202 in relation to a leg 158b of the table 105 (FIG. 1B) and a floor 304. The cable 302 may be provided by different conductor components and connections so as to form a ground connection from the conductive sheet 202 to the ground 306.

Figure 3A:
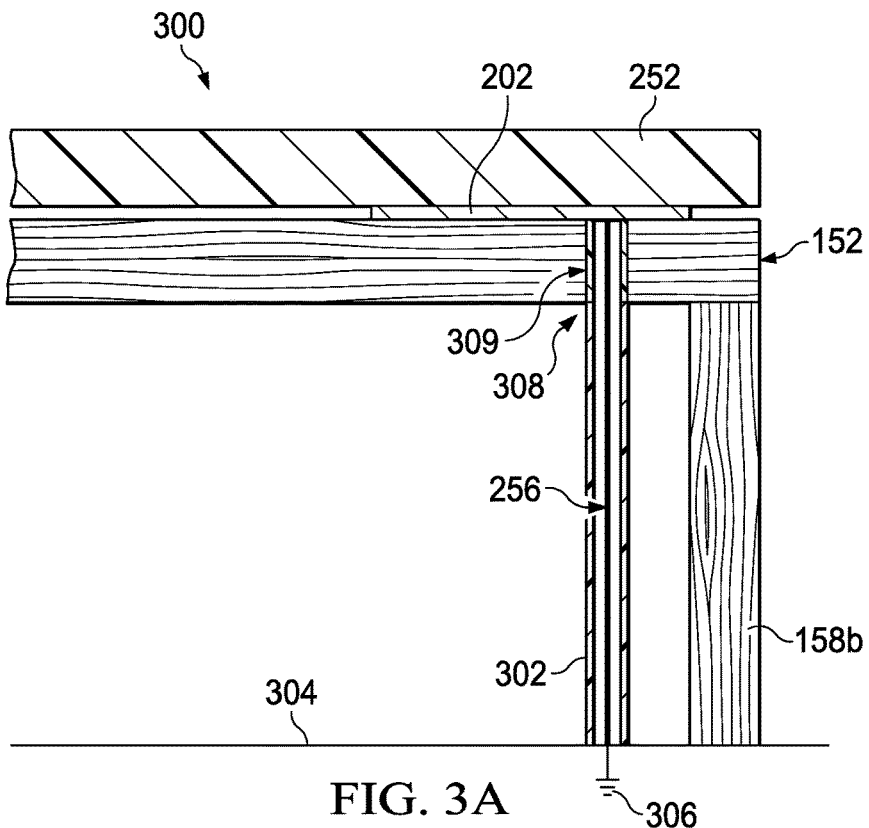
FIGS. 3A, 3B, 3C and 3D are side views of illustrative conductive sheets and ground connections in a system in a high-voltage test environment, in accordance with various examples.

FIG. 3A illustrates an example ground connection configuration 300 in which the ground connection 256 couples the conductive sheet 202 to the ground 306 in floor 304 via a conduit 309 in the non-conductive layer 152, through an orifice 308 defined by a bottom surface of the non-conductive layer 152, and through an insulative cable 302. For prevention of inadvertent contact, the cable 302 includes an insulated coating.

Figure 3B:
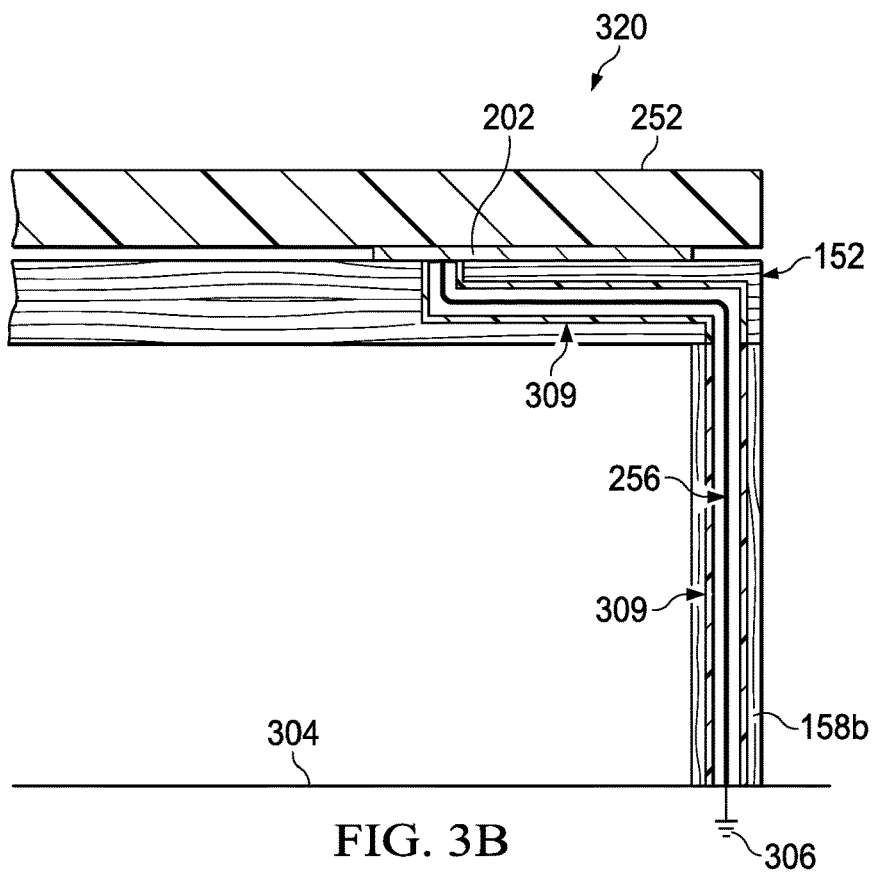

FIG. 3B illustrates an example of a ground connection configuration 320 in which the ground connection 256 couples the conductive sheet 202 to ground 306 in floor 304 via a conduit 309 that extends vertically and horizontally through the non-conductive layer 152 and vertically through the leg 158b. In this respect, inadvertent contact with the ground connection 256 is mitigated via the generally non-conductive or resistive material of the non-conductive layer 152 and the leg 158b.

Figure 3C:
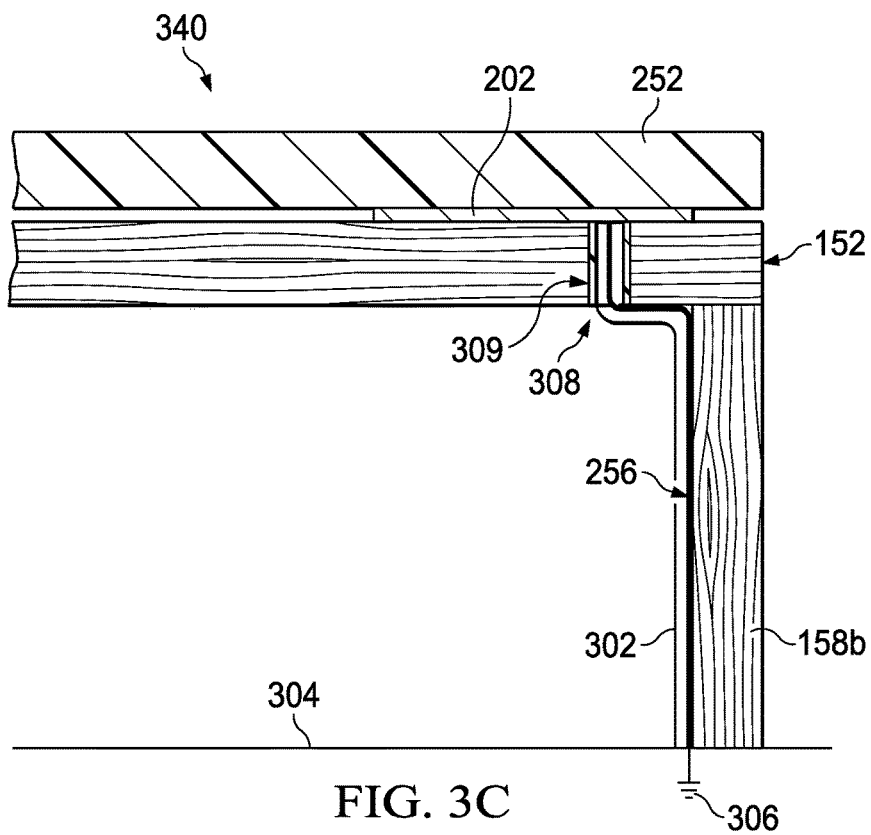

FIG. 3C illustrates an example of a ground connection configuration 340 in which the ground connection 256 couples the conductive sheet 202 to ground 306 via a conduit 309 extending vertically through the non-conductive layer 152 and through the orifice 308, and through the insulative cable 302 that is fastened to a bottom surface of the non-conductive layer 152 and along the leg 158b.

Figure 3D:
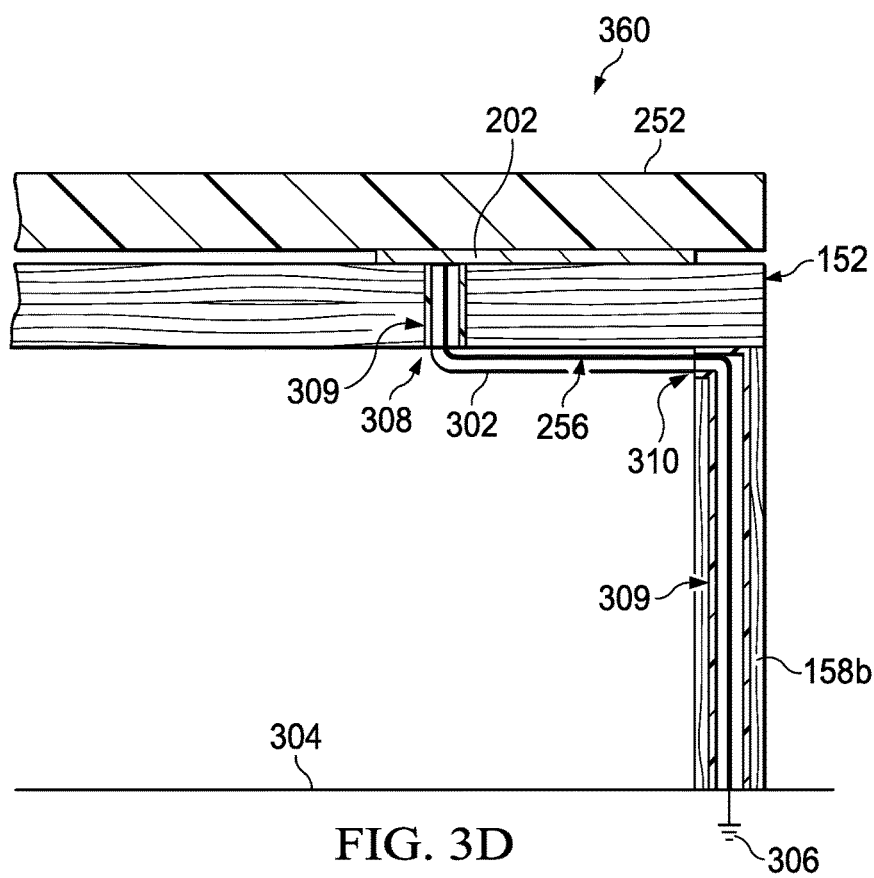

FIG. 3D illustrates an example of a ground connection configuration 360 in which the ground connection 256 couples the conductive sheet 202 to ground 306 via a conduit 309 that extends vertically through the non-conductive layer 152, through an orifice 308 defined by a bottom surface of the non-conductive layer 152, through the insulative cable 302 fastened along the bottom surface of the non-conductive layer 152, through an orifice 310 defined by a lateral aspect of the leg 158b, and through a conduit 309 that extends horizontally and then vertically through the leg 158b.

Figure 4:
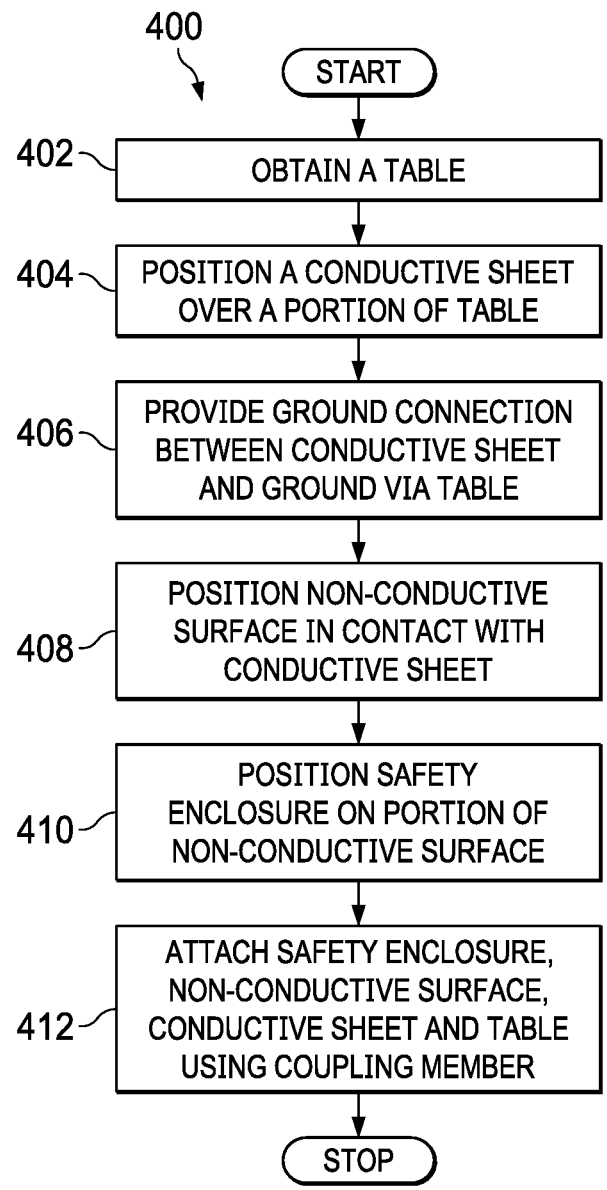
FIG. 4 illustrates a process for discharging coupling charges in a system in a high-voltage test environment in accordance with various examples.

FIG. 4 illustrates a process 400 for discharging the coupling forces in a high-voltage test environment. At operation 402, a table (e.g., a non-conductive layer 152) is obtained, in which at operation 404 a conductive sheet is positioned over a portion of the table.

At operation 406, a ground connection is provided between the conductive sheet and ground via the table. The ground connection, in an example, can be through an insulation cable extending from the table to the ground, where the insulation cable is configured to contain at least a portion of the ground connection. In another example, the ground connection can be provided via a conduit inside a leg of the table. In a further example, the ground connection can be provided through a conduit in the table and fastening the ground connection to a surface of the table and to a leg of the table, at least a portion of the ground connection being housed within an insulation cable. In yet another example, the ground connection is provided by fastening the ground connection to a surface of the table, and positioning the ground connection within a conduit inside a leg of the table. In some examples, aspects of one or more of the foregoing examples are combined.

At operation 408 a non-conductive surface is positioned in contact with the conductive sheet, wherein the non-conductive surface secures the conductive sheet between the non-conductive surface and the table.

At operation 410, a safety enclosure is positioned on a portion of the non-conductive surface. At operation 412, a coupling member is used to couple the safety enclosure, the non-conductive surface, the conductive sheet, and the table.

The method 400 may be adjusted as desired, including by adding, deleting, modifying, or rearranging one or more steps.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A system, comprising:
    a non-conductive layer;
    a conductive sheet positioned on an area of the non-conductive layer;
    a non-conductive surface in contact with the conductive sheet;
    a safety enclosure positioned on the non-conductive surface and containing a device which receives a test voltage from a 1000 volt or higher voltage source;
    a ground connection coupling to the conductive sheet and extending through the non-conductive layer; and
    a coupling member to couple together the non-conductive layer, the conductive sheet; the non-conductive surface, and the safety enclosure.

2. The system of claim 1, wherein at least a portion of the non-conductive layer is not covered by the non-conductive surface.

3. The system of claim 2, wherein the non-conductive surface is in contact with at least a portion of the non-conductive layer.

4. The system of claim 1, wherein the non-conductive surface has a surface resistivity of at least $1\times10^5$ ohms/square.

5. The system of claim 1, wherein the ground connection extends through a conduit in a supporting member of the non-conductive layer.

6. The system of claim 1, wherein the coupling member comprises a screw composed of non-conducting material.

7. The system of claim 1, wherein the non-conductive surface comprises a laminated layer.

8. The system of claim 7, wherein the non-conductive surface is composed of a phenol.

9. A system comprising:
    a table supported by a leg and having first and second non-conductive portions;
    a conductive sheet positioned between the non-conductive portions;
    a safety enclosure positioned on the first non-conductive portion of the table and containing a device which receives a test voltage from a 1000 volt or higher voltage source;
    a ground connection coupled between the conductive sheet and ground and extending through the second non-conductive portion and along the leg; and
    a coupling member fastening together the first and second non-conductive portions, the conductive sheet, and the safety enclosure.

10. The system of claim 9, wherein at least a portion of the ground connection is positioned within an insulation cable.

11. The system of claim 9, wherein at least a portion of the ground connection is positioned inside the leg.

12. The system of claim 9, wherein the ground connection passes through a conduit in the second non-conductive portion and extends into an insulation cable, wherein the insulation cable is fastened to a surface of the table and to the leg.

13. The system of claim 9, wherein the coupling member comprises a non-conductive screw.

14. A method comprising:
    obtaining a table;
    positioning a conductive sheet over a portion of the table;
    providing a ground connection between the conductive sheet and ground via the table;
    positioning a non-conductive surface in contact with the conductive sheet, wherein the non-conductive surface secures the conductive sheet between the non-conductive surface and the table:
    positioning a safety enclosure on a portion of the non-conductive surface, the safety enclosure containing a device which receives a test voltage from a 1000 volt or hi her voltage source; and
    attaching the safety enclosure, the non-conductive surface, the conductive sheet, and the table using a coupling member.

15. The method of claim 14, further comprising providing the ground connection to the conductive sheet through an insulation cable extending from the table to the ground, wherein the insulation cable is configured to contain at least a portion of the ground connection.

16. The method of claim 14, further comprising providing the ground connection to the conductive sheet via a conduit inside a leg of the table.

17. The method of claim 14, further comprising providing the ground connection to the conductive sheet through a conduit in the table and fastening the ground connection to a surface of the table and to a leg of the table, at least a portion of the ground connection housed within an insulation cable.

18. The method of claim 14, further comprising providing the ground connection to the conductive sheet through a conduit in the table, fastening the ground connection to a surface of the table, and positioning the ground connection within a conduit inside a leg of the table.

19. The method of claim 14, wherein the coupling member comprises a non-conductive nail.

* * * * *